United States Patent
Baardse et al.

(10) Patent No.: US 11,947,877 B2
(45) Date of Patent: Apr. 2, 2024

(54) ANTI-CONSTRAINT CONFIGURATION AND ENFORCEMENT FOR COMPUTER-AIDED DESIGN (CAD) MODELS

(71) Applicant: Siemens Industry Software Inc., Plano, TX (US)

(72) Inventors: Dick Baardse, Geldermalsen (NL); Steven Robert Jankovich, Buena Park, CA (US); Douglas King, Peterborough (GB); Howard Mattson, Impington (GB); Manoj Radhakrishnan, Pune (IN)

(73) Assignee: Siemens Industry Software Inc., Plano, TX (US)

( * ) Notice: Subject to any disclaimer, the term of this patent is extended or adjusted under 35 U.S.C. 154(b) by 351 days.

(21) Appl. No.: 17/268,678

(22) PCT Filed: Apr. 26, 2019

(86) PCT No.: PCT/US2019/029302
§ 371 (c)(1),
(2) Date: Feb. 16, 2021

(87) PCT Pub. No.: WO2020/050881
PCT Pub. Date: Mar. 12, 2020

(65) Prior Publication Data
US 2021/0192098 A1  Jun. 24, 2021

(51) Int. Cl.
*G06F 30/10* (2020.01)
*G06F 111/04* (2020.01)

(52) U.S. Cl.
CPC .......... *G06F 30/10* (2020.01); *G06F 2111/04* (2020.01)

(58) Field of Classification Search
CPC ....... G06F 30/10; G06F 30/00; G06F 2111/04
See application file for complete search history.

(56) References Cited

U.S. PATENT DOCUMENTS

| 5,784,063 A * | 7/1998 | Nagakura ............... G06T 19/20 345/420 |
| 10,032,304 B1 | 7/2018 | Blumenthal et al. |
| 2008/0162091 A1 | 7/2008 | Lechine |

(Continued)

FOREIGN PATENT DOCUMENTS

| CN | 105229643 A | 1/2016 |
| JP | H07152817 A | 6/1995 |

(Continued)

OTHER PUBLICATIONS

A. Seth, J. M. Vance, J. H. Oliver, "Combining Dynamic Modeling with Geometric Constraint Management to Support Low Clearance Virtual Manuel Assembly" pp. 081002-1-081002-7, ASME, 2010 (Year: 2010).*

(Continued)

*Primary Examiner* — Kibrom K Gebresilassie

(57) ABSTRACT

A computer-aided design (CAD) system may support anti-constraint configuration and enforcement for CAD models that represent physical objects. Anti-constraints may specify given constraints not to be applied for components of the CAD model, and the CAD system may update components of the CAD model without applying the constraints specified in anti-constraints applicable to the CAD model components.

19 Claims, 6 Drawing Sheets

(56) References Cited

U.S. PATENT DOCUMENTS

| | | | |
|---|---|---|---|
| 2009/0237410 A1 | 9/2009 | Baardse et al. | |
| 2009/0248369 A1* | 10/2009 | Debono | G06F 30/00 |
| | | | 703/1 |
| 2009/0259442 A1* | 10/2009 | Gandikota | G06T 19/20 |
| | | | 703/1 |
| 2014/0012546 A1* | 1/2014 | Mattson | G06F 30/17 |
| | | | 703/1 |
| 2017/0337215 A1* | 11/2017 | Bowman | G06F 16/1794 |

FOREIGN PATENT DOCUMENTS

| | | |
|---|---|---|
| JP | H0863495 A | 3/1996 |
| JP | 2008165809 A | 7/2008 |

OTHER PUBLICATIONS

PCT International Search Report and Written Opinion of International Searching Authority dated Jul. 29, 2019 corresponding to PCT International Application No. PCT/US2019/029302 filed Apr. 26, 2019.

* cited by examiner

ANTI-CONSTRAINT CONFIGURATION AND ENFORCEMENT FOR COMPUTER-AIDED DESIGN (CAD) MODELS

BACKGROUND

Computer systems can be used to create, use, and manage data for products and other items. Examples of computer systems include computer-aided design (CAD) systems (which may include computer-aided engineering (CAE) systems), visualization and manufacturing systems, product data management (PDM) systems, product lifecycle management (PLM) systems, and more. These systems may include components that facilitate design and simulated testing of product structures.

SUMMARY

Disclosed implementations include systems, methods, devices, and logic that support anti-constraint configuration and enforcement for CAD models that represent physical objects. Anti-constraints may specify given constraints not to be applied for components of a CAD model.

In one example, a method may be performed, executed, or otherwise carried out by a CAD system. The method may include maintaining a CAD model that represents a physical object; setting an anti-constraint for a component of the CAD model, the anti-constraint specifying a given constraint not to be applied for the component of the CAD model; identifying a user modification to the CAD model that impacts the component; and updating the component in connection with the user modification without applying the given constraint specified in the anti-constraint.

In another example, a system may include an anti-constraint configuration engine and an anti-constraint enforcement engine. The anti-constraint configuration engine may be configured to identify a user action specifying that a given constraint is not to be applied for a component of a CAD model that represents a physical object and set an anti-constraint for the component of the CAD model, the anti-constraint specifying the given constraint is not to be applied for the component of the CAD model. The anti-constraint enforcement engine may be configured to identify a user modification to the CAD model that impacts the component and update the component in connection with the user modification without applying the given constraint specified in the anti-constraint.

In yet another example, a non-transitory machine-readable medium may store instructions executable by a processor. Upon execution, the instructions may cause the processor or a CAD system to maintain a CAD model that represents a physical object; set an anti-constraint for a component of the CAD model, the anti-constraint specifying a given constraint not to be applied for the component of the CAD model; identify a user modification to the CAD model that impacts the component; and update the component in connection with the user modification without applying the given constraint specified in the anti-constraint, including by identifying a candidate update to the component that includes the given constraint and determining not to apply the candidate update to the component in connection with the user modification to the CAD model.

BRIEF DESCRIPTION OF THE DRAWINGS

Certain examples are described in the following detailed description and in reference to the drawings.

DETAILED DESCRIPTION

Figure 1:
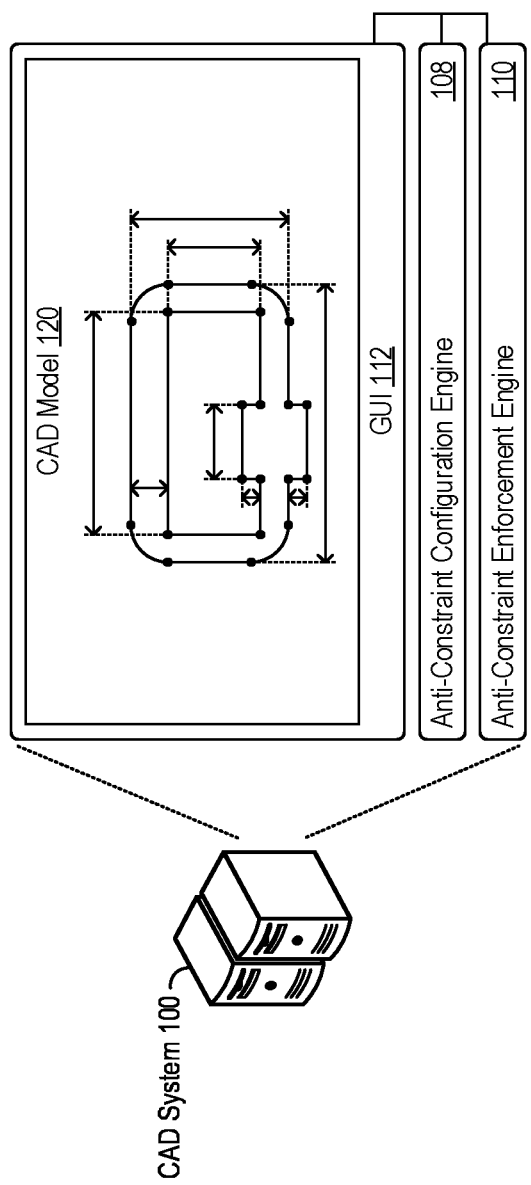
FIG. 1 shows an example of a CAD system that supports anti-constraint configuration and enforcement for CAD models.

The discussion below refers to constraints. A constraint may refer to any characteristic, feature, restriction, behavioral trait, or other defining aspect of a design component. In the context of CAD models, CAE models, or other graphic models that represent physical objects, a constraint may ensure certain component characteristics are maintained during subsequent changes or edits to a CAD model. Constraints may be defined in relation to other components of a design, and example constraints include parallel constraints, symmetry constraints, rotational, radial, tangent, collinear, and other geometric or positional constraints, dimension value thresholds, distance thresholds, shape requirements, orientation restrictions, and many more. Constraints may ensure that certain physical characteristics of a designed object are maintained during the product design phases through CAD tools.

CAD systems may support application of various constraints upon any number of components of a graphic model, such as lines, curves, shapes, design elements, and the like. As such, constraints may allow a graphic model to maintain certain design characteristics even as the graphic model is further changed, modified, or processed.

Although CAD systems may allow users to manually input constraints to design components of a CAD model, creating a comprehensive and accurate set of constraints can be time-consuming and confusing, particularly as the size and complexity of CAD models increase. Physical products designed through CAD models may include millions of components, often more, making consistent CAD model behavior time-consuming and computationally intensive.

Some CAD systems may infer constraints based on user action (e.g., curve placement in parallel or tangential positions), which can be optionally applied during an edit operation by a user. Constraint inference may attempt to determine user intent in modifications and actions, providing possible or recommended CAD modifications to consistently apply via inferred constraints. In some instances, however, inferred constraints can be incomplete, inaccurate, or non-persistent. On the other hand, full user-specification of every applicable constraint in a CAD model is time-consuming and can often lead to inaccuracies or inconsistencies.

The disclosure herein may provide systems, methods, devices, and logic for anti-constraint configuration and enforcement. As described in greater detail below, an anti-constraint may refer to a particular constraint or set of constraints that a CAD system elects not to apply to components of a CAD model. In that regard, the features described herein may provide mechanisms by which a CAD system disables constraints for a CAD model. As CAD systems can infer multiple, different constraints based on user modifications to a CAD model, anti-constraint configuration and specification may narrow the set of possible constraints to apply to a CAD model, supporting consistent CAD model behavior with increased efficiency and reduced memory requirements.

For instance, the anti-constraint features described herein may result in consistent CAD model behavior as compared to a well-defined CAD model (e.g., via a constraint solver), but doing so with reduced memory requirements and increased computing performance. The number of anti-constraints tracked by a CAD system may be tens to hundreds of times less (or even more so) than the number of explicit constraints determined through a constraint solver for a fully-constrained model, yet may nonetheless maintain consistent model behavior. As such, the anti-constraint features described herein may provide consistent, accurate CAD model performance with reduced memory requirements and increased performance, thus providing a technical improvement to CAD computing systems. Moreover, the anti-constraint features described herein may reduce required user time in CAD model design, reduce computing and resource consumption, and improve usability of CAD systems by allowing users to focus on model design instead of learning and manually applying complex design constraints over and over.

FIG. 1 shows an example of a CAD system 100 that supports anti-constraint configuration and enforcement for CAD models. The CAD system 100 may take the form of a computing system, including a single or multiple computing devices such as application servers, compute nodes, desktop or laptop computers, smart phones or other mobile devices, tablet devices, embedded controllers, and more. In some implementations, the CAD system 100 implements a CAD tool or CAD program through which a user may design and simulate testing of product structures.

As described in greater detail herein, the CAD system 100 may relax or otherwise disable constraints that have been determined (e.g., inferred) for a CAD model, doing so via anti-constraints. In that sense, the CAD system 100 may control CAD model components based, at least in part, on user indication or intent of how the CAD model is not to behave. For example, the CAD system 100 may utilize a combination of anti-constraints and constraints (both of which may be user-specified) to control behavior of the CAD model, e.g., changes resulting from user modifications during active edit modes (e.g., sketch mode) or other design modifications that impact the CAD model during inactive modes. Such control may provide for a consistent mechanism to ensure proper CAD model behavior, but do so without the costly computational requirements for a constraint solver or other processes to determine a fully well-behaved constraint model.

As an example implementation, the CAD system 100 shown in FIG. 1 includes an anti-constraint configuration engine 108, an anti-constraint enforcement engine 110, and graphical user interface (GUI) 112. The CAD system 100 may implement the engines 108 and 110 (and components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the CAD system 100 implements multiple engines using the same computing system features or hardware components (e.g., a common processor or a common storage medium). The GUI 112 may include various components through which a user interfaces with the CAD system 100, such as a display, keyboard, mouse, touchscreen, etc.

A user may access and modify a CAD model through the GUI 112, for instance to modify the CAD model 120 shown in FIG. 1. In operation, the anti-constraint configuration engine 108 may identify a user action specifying that a given constraint is not to be applied for a component of the CAD model 120 and set an anti-constraint for the component of the CAD model 120. The anti-constraint enforcement engine 110 may identify a user modification to the CAD model 120 that impacts the component and update the component in connection with the user modification without applying the given constraint specified in the anti-constraint.

Some example features of anti-constraint configuration and enforcement are described in greater detail next. Many of the following examples are described in the context of 2-dimensional (2D) CAD models and geometric constraints on lines or curves in such 2D CAD models. However, any of the features described herein may be consistently applied to CAD models or component constraints of any dimension and type.

Figure 2:
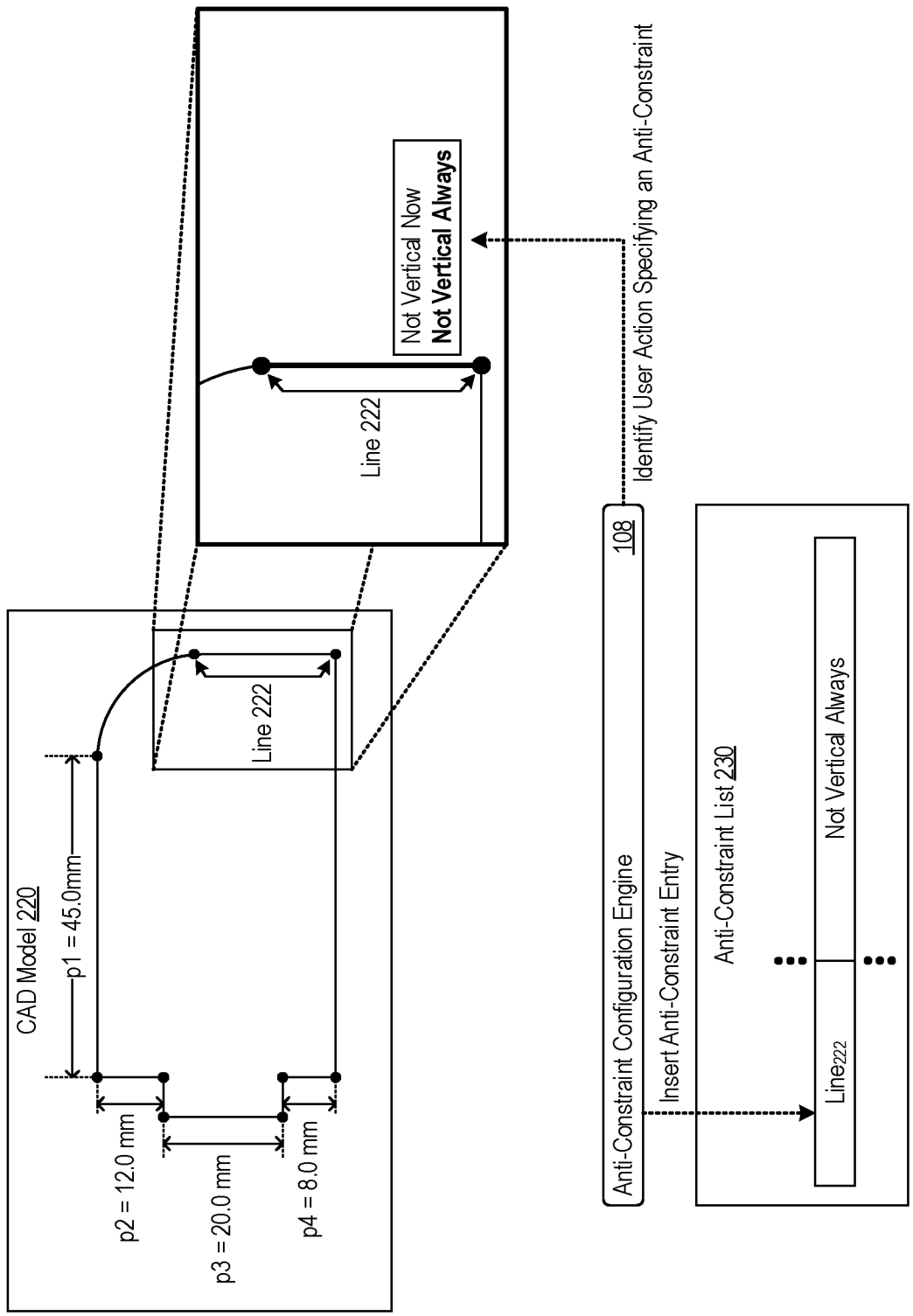
FIG. 2 shows an example anti-constraint configuration by an anti-constraint configuration engine.

FIG. 2 shows an example anti-constraint configuration by the anti-constraint configuration engine 108. The example shown in FIG. 2 is provided with respect to a CAD model 220, which may depict a 2D design model that represents a physical object. The CAD model 220 may thus include lines, curves, dimensions, parameters, constraints, and other design characteristics of the represented physical object and components thereof. In FIG. 2, the CAD model 220 includes various components, including the line 222 as well as dimension values labeled as "p1", "p2", "p3", and "p4" with their corresponding dimension values.

In some examples, the anti-constraint configuration engine 108 maintains the CAD model 220. In doing so, the anti-constraint configuration engine 108 may store the CAD model 220, present the CAD model 220 through a GUI, or otherwise control user access to the CAD model 220. As such, the anti-constraint configuration engine 108 may implement various CAD functions for a user to create and modify the CAD model 220.

The anti-constraint configuration engine 108 may implement any feature of the CAD system 100 related to identification, specification, or other configuration of an anti-constraint. For instance, the anti-constraint configuration engine 108 may support specifying and configuring anti-constraints on a component-specific basis. That is, the anti-constraint configuration engine 108 may set any number of anti-constraints for a particular component of the CAD model 220 and set other anti-constraints applicable to another component of the CAD model 220. As an illustrative example, the CAD model 220 shown in FIG. 2 includes the CAD model component identified as the line 222, and the anti-constraint configuration engine 108 may identify and configure anti-constraints specific to the line 222 (as compared to other components of the CAD model 220).

In some implementations, the anti-constraint configuration engine 108 provides mechanisms by which a CAD user may specify an anti-constraint. Any type of visual indicator or specification mechanism is contemplated, for example by presenting anti-constraint specification icons in a GUI 112 displaying the CAD model 220. The anti-constraint configuration engine 108 may, in some systems, provide an anti-constraint menu by which a user may select or specify various anti-constraint configurations.

As an illustrative example shown in FIG. 2, the anti-constraint configuration engine 108 provides an anti-constraint menu for the line 222 of the CAD model 220. The anti-constraint configuration engine 108 may produce the anti-constraint menu to include any number of inferred or possible constraints identified for a particular CAD model component, and further provide an option to set an anti-constraint for the inferred/possible constraints. Using the line 222 has an example, a CAD system 100 may infer a vertical constraint for the line 222 based on the orientation or positioning of the line 222 from a previous user action. Other possible inferred constraints (not illustrated in FIG. 2) include parallel or tangent constraints between the line 222 and other CAD components of the CAD model 220.

For the inferred vertical constraint, the anti-constraint configuration engine 108 provides a selection mechanism for a user to specify the vertical constraint as anti-constraint, an example of which is shown in FIG. 2 through the "Not Vertical" options. Thus, an anti-constraint for the line 222 may specify particular constraints (e.g., the vertical constraint) not to apply to the line 222. The vertical anti-constraint may indicate to a CAD system 100 that the line 222 need not be positioned in a vertical orientation, and that subsequent modifications to the CAD model 220 may (and perhaps should) re-orient the line 222 to no longer be in a vertical orientation.

As further seen in the illustrative example in FIG. 2, the anti-constraint configuration engine 108 may support configuration of different types of anti-constraints, such as temporary type anti-constraints, permanent type anti-constraints, and conditional type anti-constraints. Temporary type anti-constraints may be applicable to the CAD model 220 on a temporary basis, e.g., with respect a particular user action or modification by which given constraints are inferred or a particular editing or sketch session for the CAD model 220. The "Not Vertical Now" option in FIG. 2 illustrates a temporary type anti-constraint that the anti-constraint configuration engine 108 may provide.

Permanent type anti-constraints may be applicable to the CAD model 220 until otherwise deactivated. Thus, a CAD system 100 may apply permanent type anti-constraints for subsequent user actions or other design changes that impact the CAD model components that the permanent type anti-constraints are applicable to. The "Not Vertical Always" option in FIG. 2 illustrates a permanent type anti-constraint that the anti-constraint configuration engine 108 may provide.

Conditional type anti-constraints are contemplated herein as well, which the anti-constraint configuration engine 108 may provide, set, or configure. A conditional type anti-constraint may specify particular conditions under which a given constraint is not to be applied (and, accordingly, when the given constraint is to be applied, when the particular conditions are not met). In that regard, the anti-constraint configuration engine 108 may correlate any number of conditions to a particular anti-constraint, in which a given constraint is not to be applied upon a determination that the correlated conditions are satisfied. Any type of condition can be set for a conditional type anti-constraint. Example conditions include specific dimension ranges (e.g., lines less than 5 mm in length), geometric property conditions (do not apply for circles, but apply for ellipses), distance thresholds, conditions based on component number (e.g., when a number of model elements exceeds a threshold), or any other specified conditions. Such conditions may be user-specified, for example.

The anti-constraint configuration engine 108 may specify, identify, set, alter, or otherwise configure an anti-constraint in various ways. In some implementations, the anti-constraint configuration engine 108 maintains an anti-constraint list 230 that tracks any anti-constraints applicable to components of the CAD model 220. The anti-constraint configuration engine 108 may itself implement the anti-constraint list 230 or access the anti-constraint list 230 remotely (or a combination of both). The anti-constraint list 230 may take the form of any data structure that associates CAD model components to anti-constraints (e.g., as anti-constraint entries), and may thus include tables, relational databases, or other suitable data structures.

In FIG. 2, the anti-constraint configuration engine 108 identifies a user action to set an anti-constraint for the line 222 (e.g., by a user selection of the "Not Vertical Always" option). In response, the anti-constraint configuration engine 108 may insert an anti-constraint entry into the anti-constraint list 230 for the line 222. In this example, the anti-constraint entry specifies a permanent type vertical anti-constraint for the line 222. In a consistent manner, a CAD system 100 may configure anti-constraints for various components of a CAD model.

Figure 3:
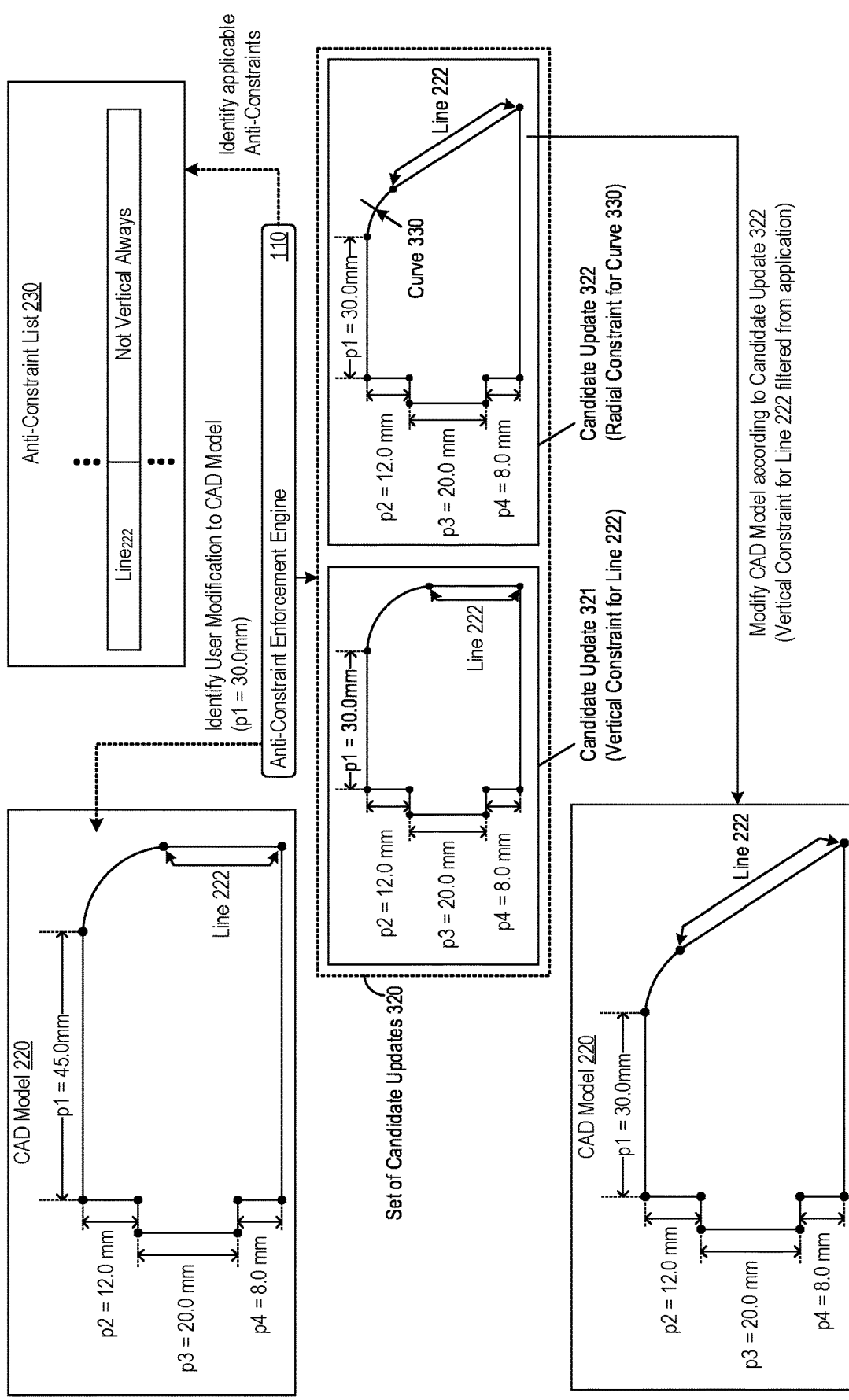
FIG. 3 shows example anti-constraint enforcement by an anti-constraint enforcement engine.

FIG. 3 shows example anti-constraint enforcement by the anti-constraint enforcement engine 110. In a general sense, the anti-constraint enforcement engine 110 may control the CAD model 220 such that any constraints specified as anti-constraints for CAD model components are not applied to the CAD model 220. In particular, the anti-constraint enforcement engine 110 may identify a user modification to the CAD model 220 that impacts a component with an anti-constraint and update the component in connection with the user modification without applying the given constraint specified in the anti-constraint.

A user-made change to alter a particular CAD model component may impact the size, shape, or rendering of other components related to the particular CAD model component. For instance, a user-action to resize a shape of the CAD model 220 may further cause the CAD system 100 to modify multiple lines or curves that form the shape or are otherwise related to the shape. Such impact may be determined by the anti-constraint enforcement engine 110 through any other components that are related to the particular CAD model component through a specified or inferred constraint (e.g., by parallel, threshold distance, tangent, collinear, or other constraints) or are themselves constrained in a particular way (e.g., to be vertical, horizontal, fixed in a particular position, maintain a particular length, etc.) that the user-made change will impact.

To illustrate, various user actions to the CAD model 220 (or a larger design that includes the physical object represented by the CAD model 220) may impact the line 222. One such change includes a change to the dimension value of the dimension "p1" shown in FIG. 2. When the dimension value of p1 changes, a CAD system 100 may update the CAD model 220 in a way such that the line 222 changes, and thus a user-made change to reduce the dimension value of p1 impacts the line 222. The dimension p1 and the line 222 may thus be characterized as related components of the CAD model 220.

A user-made change to the dimension value p1 of the CAD model 220 may cause enforcement of a specified anti-constraint. When the dimension value p1 changes, other related components in the CAD model 220 (including the lines 222) can update in multiple ways. In the specific examples shown in FIG. 3, the CAD system 100 identifies a user-action to reduce the dimension value p1 from 45.0 to 30.0.

Before, during, or after decreasing the dimension value p1 to 30.0, the CAD system 100 may identify components of the CAD model 220 that may be impacted by the dimension value change. That is, the anti-constraint enforcement engine 110 may identify CAD model components related to the dimension p1. In updating the CAD model 220 based on the dimension value change to p1, the anti-constraint enforcement engine 110 may infer or otherwise determine constraints for related components impacted by the dimension value decrease. Put another way, the anti-constraint enforcement engine 110 may identify a set of candidate updates for related components impacted by the user-made change. The set of candidate updates may represent a set of possible updates a CAD system 100 may make to the CAD model 220 to effectuate the dimension value reduction to p1, and may thus include various inferred constraints for related components.

In the example shown in FIG. 3, the anti-constraint enforcement engine 110 identifies the set of candidate updates 320 to apply to the line 222 based on the user modification to the CAD model 220 to reduce the dimension value of p1. In particular, the set of candidate updates 320 determined for the CAD model 220 includes the following inferred constraints for the line 222: (i) a vertical constraint for line 222, keeping line 222 in a vertical orientation even as the dimension p1 is reduced in length (shown as the candidate update 321 in FIG. 3); and (ii) a radial constraint for the curve 330 in the CAD model 220, maintaining a consistent radius value for the curve 330 (shown as the candidate update 322 in FIG. 3). While two example candidate updates are shown in FIG. 3, the anti-constraint enforcement engine 110 may determine candidate updates for combinations of related components as well, e.g., permutations or combinations of different inferred constraints for multiple related components respectively.

To enforce specified anti-constraints, the anti-constraint enforcement engine 110 may filter any candidate updates that apply a given constraint that an anti-constraint specifies not to apply. To do so, the anti-constraint enforcement engine 110 may perform a lookup into the anti-constraint list 230 to identify any anti-constraints specified for CAD model component impacted or otherwise related to a user modification to the CAD model 220. In the example of FIG. 3, the anti-constraint enforcement engine 110 identifies a permanent type vertical anti-constraint applicable to the line 222 (which, as discussed above, is related to the dimension p1). In response, the anti-constraint enforcement engine 110 may enforce the specified anti-constraint to the line 222 by filtering the candidate update 321 from application. The anti-constraint enforcement engine 110 may then select a candidate update from the filtered set for application. In the specific example illustrated in FIG. 3, the filtered set includes only the candidate update 322, and thus the anti-constraint enforcement engine 110 may update the CAD model 220 according to the candidate update 322 in reducing the dimension value of p1 to 30.0. Accordingly, the anti-constraint enforcement engine 110 may determine not to enforce a vertical constraint for the line 222 in accordance with the specified anti-constraint.

Note that even though the anti-constraint list 230 specifies a vertical anti-constraint for the line 222, scenarios exist in which the anti-constraint enforcement engine 110 may modify the CAD model 220 such that the line 222 is in a vertical orientation. Such a scenario may occur based on a subsequent user-change to increase the dimension value of p1 back to 45.0, e.g., in which a radial constraint for the curve 330 causes the line 222 to be modified to a vertical orientation. Thus, an anti-constraint does not specify that a component can never be modified in a manner such that the given constraint is met. Instead, the anti-constraint may cause a CAD system 100 not to limit modifications to a CAD model with the given constraint specified in the anti-constraint.

As described above, the anti-constraint enforcement engine 110 may update a CAD model by not applying a given constraint specified in an anti-constraint. Other implementation examples are contemplated to update a component of the CAD model 220 without applying a given constraint specified in an anti-constraint.

As one example, the anti-constraint enforcement engine 110 may identify a set of candidate constraints to apply to a CAD model component based on a user modification to the CAD model (as compared to a set of candidate updates that may include combinations of multiple different constraints applied to components related to a user modification). The set of candidate constraints may include constraints inferred for the CAD model component.

In this example, the anti-constraint enforcement engine 110 may filter a given constraint specified in an anti-constraint for the CAD model component from the set of candidate constraints. In doing so, the anti-constraint enforcement engine 110 may obtain a filtered set of candidate constraints (e.g., filter a vertical anti-constraint inferred for a component, resulting in a filtered list that includes a tangent constraint and a coincident constraint). Then, the anti-constraint enforcement engine 110 may apply a candidate constraint from the filtered set of candidate constraints to the CAD model component in connection with the user modification to the CAD model.

While FIG. 3 depicts an illustrative example for a particular anti-constraint for the line 222, a CAD system 100 may enforce multiple anti-constraints, including for multiple different CAD model components. Thus, the anti-constraint configuration engine 108 may set multiple anti-constraints for a given CAD model component, each anti-constraint of the multiple anti-constraints specifying a different constraint not to be applied for the given CAD model component of the CAD model. The anti-constraint enforcement engine 110 may update the CAD model component in connection with a user modification without applying any of the different constraints specified in the multiple anti-constraints.

In some examples, a CAD system 100 may provide a sketch capability of a CAD tool, through which a user may sketch a collection of 2D curves to represent a physical object as part of a design or engineering workflow. In that regard, the 2D sketch may serve as an initial or baseline CAD model for a physical object. A sketch option provided by a CAD system 100 may initially start with a blank graphic model upon which a user may insert lines and curves to represent a physical object 2-dimensionally. A CAD system 100 may support conversion of a 2D sketch into a 3D CAD model. In such examples, the CAD system 100 may identify, set, and enforce anti-constraints in accordance with user-actions made during the sketch process. For permanent type anti-constraints, the anti-constraint enforcement engine 110 may subsequently apply such anti-constraints during a 2D-to-3D conversion process as well.

A CAD system 100 may thus configure and enforce anti-constraints on a CAD model. Anti-constraints may control CAD model behavior, particularly for given CAD model components related to another CAD model component modified by a user action. By focusing on specific constraints not to apply, a CAD system 100 may provide CAD model constraining features without having to necessarily affirmatively specify every particular constraint in a CAD model. That is, the anti-constraint features described herein may support accurate, consistent, and efficient CAD model behavior without a fully-constrained or well-behaved model. Anti-constraint configuration and use may thus reduce the memory footprint of a CAD system 100 and increase computing performance through reduced resource consumption and execution time.

Figure 4:
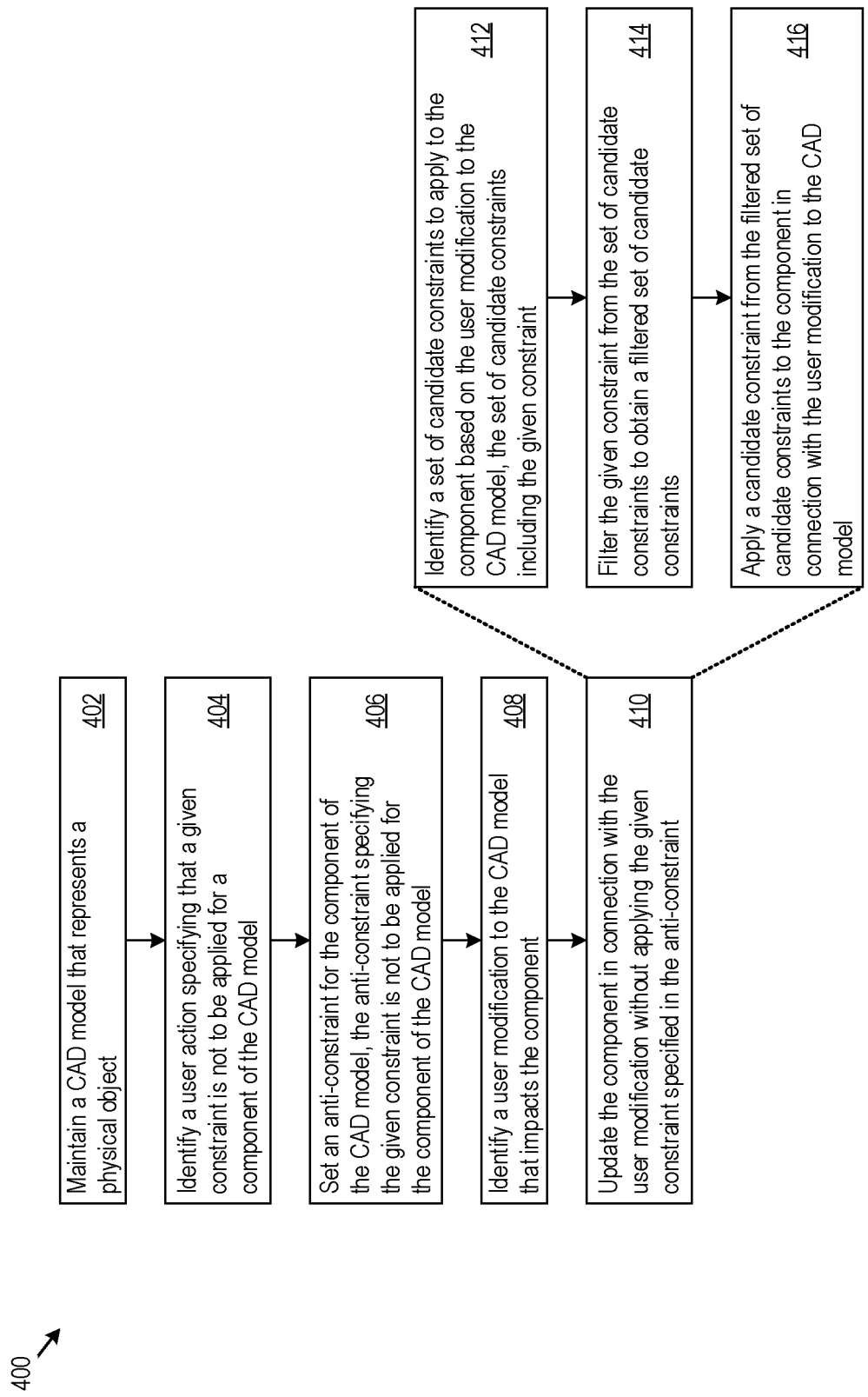
FIG. 4 shows an example of logic that a system may implement to support anti-constraint configuration and enforcement for CAD models.

FIG. 4 shows an example of logic 400 that a system may implement to support anti-constraint configuration and enforcement for CAD models. For example, the CAD system 100 may implement the logic 400 as hardware, executable instructions stored on a machine-readable medium, or as a combination of both. The CAD system 100 may implement the logic 400 through the anti-constraint configuration engine 108 and the anti-constraint enforcement engine 110, through which the CAD system 100 may perform or execute the logic 400 as a method to configure and enforce anti-constraints. The following description of the logic 400 is provided using the anti-constraint configuration engine 108 and the anti-constraint enforcement engine 110 as examples. However, various other implementation options by the CAD system 100 are possible.

In implementing the logic 400, the anti-constraint configuration engine 108 may maintain a CAD model that represents a physical object (402). Maintaining the graphic model may include controlling access and modification of the graphic model as part of a CAD tool. The anti-constraint configuration engine 108 may also identify a user action specifying that a given constraint is not to be applied for a component of the CAD model (404). In response, the anti-constraint configuration engine 108 may set an anti-constraint for the component of the CAD model, the anti-constraint specifying the given constraint is not to be applied for the component of the CAD model (406).

In some implementations, the anti-constraint configuration engine 108 may determine a set of inferred constraints for the component, the set of inferred constraints including the given constraint specified by the user action. The anti-constraint configuration engine 108 may propose the set of inferred constraints to a user for application on the component of the CAD model, and set the anti-constraint for the component of the CAD model responsive to a user action indicating that the given constraint from the proposed set of inferred constraints is not to be applied for the component.

In implementing the logic 400, the anti-constraint enforcement engine 110 may identify a user modification to the CAD model that impacts the component (408). A user modification that impacts a CAD component may include any modification directly to the component or other modification for which at least one candidate update to the CAD model (e.g., inferred constraints) includes a change to the component. Impact determination by the anti-constraint enforcement engine 110 may thus include identification of any CAD model components related to a modified component. For instance, the user modification may result in a modified CAD model component (e.g., dimension p1 in FIGS. 2 and 3) that is related to the component for which an anti-constraint is set for (e.g., the line 222).

Further, the anti-constraint enforcement engine 110 may update the component in connection with the user modification without applying the given constraint specified in the anti-constraint (410). To update the component without applying the given constraint specified in the anti-constraint, the anti-constraint enforcement engine 110 may identify a set of candidate constraints to apply to the component based on the user modification to the CAD model, the set of candidate constraints including the given constraint (412). The anti-constraint enforcement engine 110 may filter the given constraint from the set of candidate constraints to obtain a filtered set of candidate constraints (414) and apply a candidate constraint from the filtered set of candidate constraints to the component in connection with the user modification to the CAD model (416).

Figure 5:
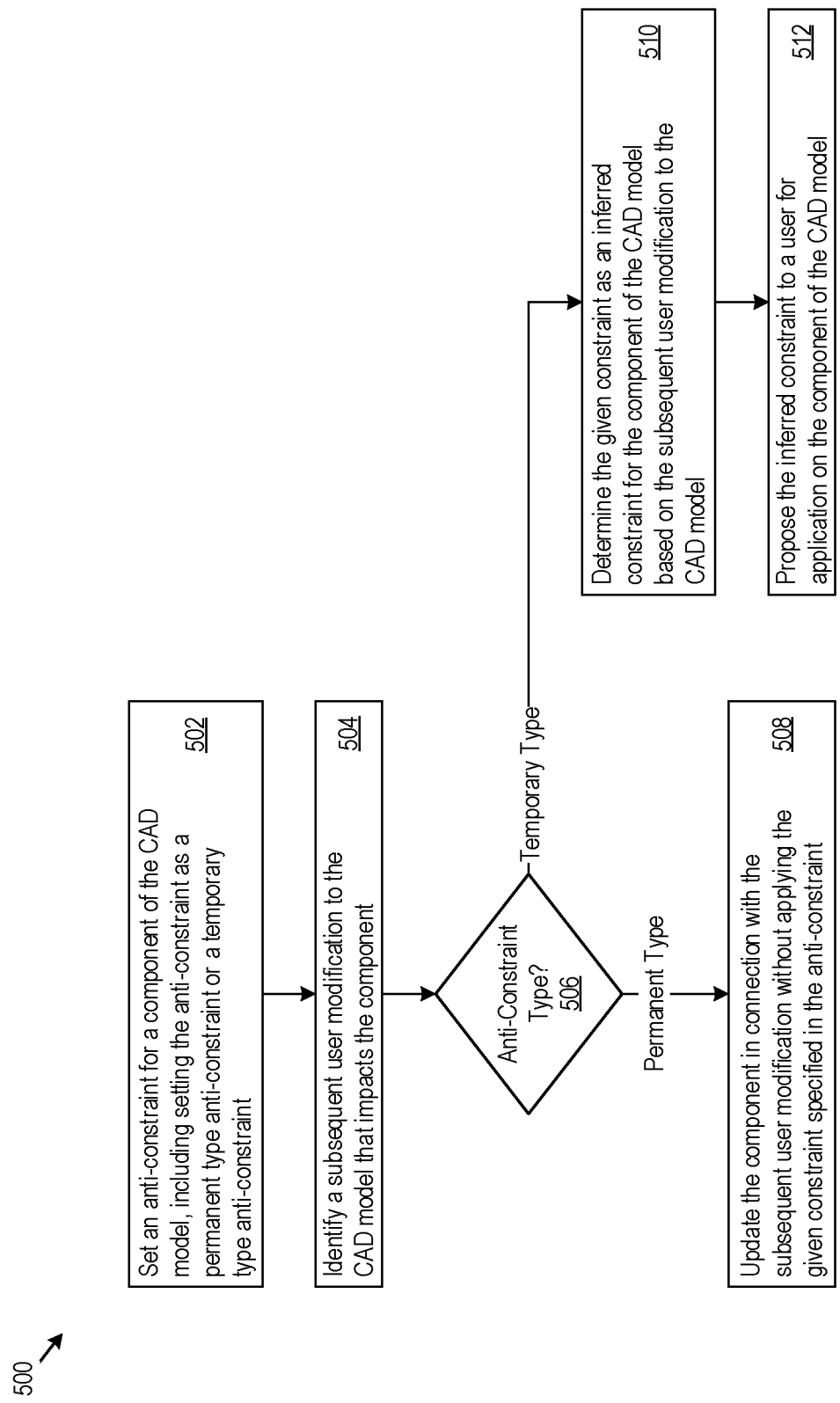
FIG. 5 shows another example of logic that a system may implement to support anti-constraint configuration and enforcement for CAD models.

FIG. 5 shows another example of logic 500 that a CAD system 100 may implement to support anti-constraint configuration and enforcement for CAD models. As noted above, a CAD system 100 may support anti-constraints of various types. The logic 500 shown in FIG. 5 provides one example of how a CAD system 100 may apply temporary and permanent type anti-constraints. The following description of the logic 500 is provided using the anti-constraint configuration engine 108 and the anti-constraint enforcement engine 110 as examples. However, various other implementation options by the CAD system 100 are possible, including as hardware, executable instructions stored on a machine-readable medium, or as a combination of both.

In implementing the logic 500, the anti-constraint configuration engine 108 may set an anti-constraint for a component of a CAD model, including setting the anti-constraint as a permanent type anti-constraint or a temporary type anti-constraint (502). The anti-constraint may indicate that a given constraint is not to be applied for the component. In some implementations, the anti-constraint configuration engine 108 may provide visual icons or selectable options by which a user may indicate an anti-constraint type (e.g., temporary or permanent). Additionally or alternatively, the anti-constraint configuration engine 108 may set or obtain anti-constraint parameters with regards to a duration of application, criteria for application (e.g., during a sketch mode, for a set amount of time, edits, or other measureable actions, etc.).

In some examples, the anti-constraint configuration engine 108 sets a temporary type anti-constraint responsive to determination or proposition of an inferred constraint for a user modification to the CAD model. A user may elect not to apply a proposed inferred constraint, upon which the anti-constraint configuration engine 108 may set a temporary type anti-constraint (e.g., through user selection of a "Not Vertical Now" option as discussed above for FIG. 2). In doing so, a CAD system 100 may apply a one-time or temporary anti-constraint for a present user modification, and subsequent present the inferred constraint for consideration, application, or rejection at a subsequent time.

A CAD system 100 may apply or enforce a specified anti-constraint based on anti-constraint type. In implementing the logic 500, the anti-constraint enforcement engine 110 may identify a subsequent user modification to a CAD model that impacts the component (504), e.g., in a similar manner as discussed above. The user modification may be subsequent in that it is subsequent to specification or setting of the anti-constraint (e.g., in which a temporary type anti-constraint may no longer be applicable to the CAD model component). In response to the subsequent user modification, the anti-constraint enforcement engine 110 may determine whether any anti-constraints have been set for the impacted component, for example via a lookup into an anti-constraint list.

For any component impacted by a user modification and set with any anti-constraints, the anti-constraint enforcement engine 110 may determine the type of each applicable anti-constraint (506). For permanent type anti-constraints, the anti-constraint enforcement engine 110 may update the component in connection with the subsequent user modification without applying the given constraint specified in the anti-constraint (508). For temporary type anti-constraints, the anti-constraint enforcement engine 110 may potentially alter the CAD model to apply the given constraint, as the anti-constraint is of a temporary type and may be inapplicable for the user modification.

For instance, the anti-constraint enforcement engine 110 may determine the given constraint (specified in the anti-constraint) as an inferred constraint for the component of the CAD model based on the subsequent user modification (510) and propose the inferred constraint to a user for application on the component of the CAD model (512). In such a case, the anti-constraint enforcement engine 110 may determine not to enforce the temporary type anti-constraint, but give a user an option in terms of application of the given constraint or not.

While FIG. 5 is presented with respect to permanent and temporary anti-constraint types, the logic 500 may include any additional or alternative elements to consistently address any conditional type anti-constraint. Accordingly, the anti-constraint enforcement engine 110 may identify anti-constraints as conditional type anti-constraints and enforce such anti-constraints when correlated conditions are satisfied, but not otherwise (e.g., apply the given constraint and in effect, not enforce the anti-constraint).

Figure 6:
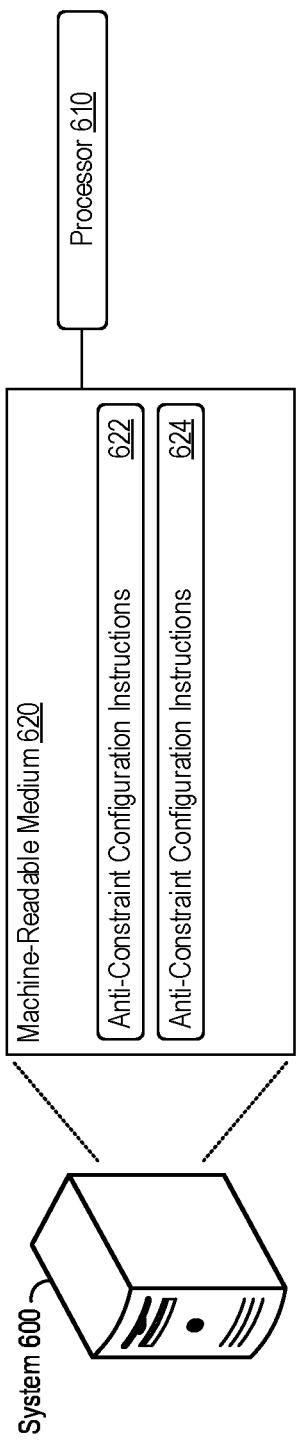
FIG. 6 shows an example of a system that supports anti-constraint configuration and enforcement for CAD models.

FIG. 6 shows an example of a system 600 that supports anti-constraint configuration and enforcement for CAD models. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the anti-constraint configuration instructions 622 and the anti-constraint enforcement instructions 624 shown in FIG. 6. As such, the machine-readable medium 620 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The system 600 may execute instructions stored on the machine-readable medium 620 through the processor 610. Executing the instructions may cause the system 600 (or any other CAD system) to perform any of the anti-constraint configuration and enforcement features described herein, including according to any of the features with respect to the anti-constraint configuration engine 108, the anti-constraint enforcement engine 110, or a combination of both. For example, execution of the anti-constraint configuration instructions 622 by the processor 610 may cause the system 600 to maintain a CAD model that represents a physical object and set an anti-constraint for a component of the CAD model, the anti-constraint specifying a given constraint not to be applied for the component of the CAD model.

Execution of the anti-constraint enforcement instructions 624 by the processor 610 may cause the system 600 to identify a user modification to the CAD model that impacts the component and update the component in connection with the user modification without applying the given constraint specified in the anti-constraint, including by identifying a candidate update to the component that includes the given constraint and determining not to apply the candidate update to the component in connection with the user modification to the CAD model.

The systems, methods, devices, and logic described above, including the anti-constraint configuration engine 108 and the anti-constraint enforcement engine 110, may be implemented in many different ways in many different combinations of hardware, logic, circuitry, and executable instructions stored on a machine-readable medium. For example, the anti-constraint configuration engine 108, the anti-constraint enforcement engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the anti-constraint configuration engine 108, the anti-constraint enforcement engine 110, or combinations thereof.

The processing capability of the systems, devices, and engines described herein, including the anti-constraint configuration engine 108 and the anti-constraint enforcement engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
   by a computer-aided design (CAD) system:
   maintaining a CAD model that represents a physical object;
   setting an anti-constraint for a component of the CAD model, the anti-constraint specifying a given constraint not to be applied for the component of the CAD model;
   identifying a user modification to the CAD model that impacts the component; and
   updating the component in connection with the user modification without applying the given constraint specified in the anti-constraint.

2. The method of claim 1, wherein updating the component in connection with the user modification without applying the given constraint comprises:
   identifying a candidate update to the component that includes the given constraint; and determining not to apply the candidate update to the component in connection with the user modification to the CAD model.

3. The method of claim 1, wherein updating the component in connection with the user modification without applying the given constraint comprises:
identifying a set of candidate constraints to apply to the component based on the user modification to the CAD model, the set of candidate constraints including the given constraint;
filtering the given constraint from the set of candidate constraints to obtain a filtered set of candidate constraints; and
applying a candidate constraint from the filtered set of candidate constraints to the component in connection with the user modification to the CAD model.

4. The method of claim 1, comprising setting the anti-constraint for the component of the CAD model responsive to user action indicating the given constraint is not to be applied for the component of the CAD model.

5. The method of claim 1, comprising:
determining a set of inferred constraints for the component, the set of inferred constraints including the given constraint;
proposing the set of inferred constraints to a user for application on the component of the CAD model; and
setting the anti-constraint for the component of the CAD model responsive to a user action indicating that the given constraint from the proposed set of inferred constraints is not to be applied for the component.

6. The method of claim 1, comprising:
setting multiple anti-constraints for the component, each anti-constraint of the multiple anti-constraints specifying a different constraint not to be applied for the component of the CAD model; and
updating the component in connection with the user modification without applying any of the different constraints specified in the multiple anti-constraints.

7. The method of claim 1, further comprising setting the anti-constraint as a permanent type anti-constraint, a temporary type anti-constraint, or any conditional type anti-constraint.

8. The method of claim 7, further comprising:
identifying a subsequent user modification to the CAD model that impacts the component; and
responsive to a determination that the anti-constraint is set as the permanent type anti-constraint:
updating the component in connection with the subsequent user modification without applying the given constraint specified in the anti-constraint; and
responsive to a determination that the anti-constraint is set as the temporary type anti-constraint:
determining the given constraint as an inferred constraint for the component of the CAD model based on the subsequent user modification to the CAD model; and
proposing the inferred constraint to a user for application on the component of the CAD model.

9. A system comprising:
an anti-constraint configuration engine configured to:
identify a user action specifying that a given constraint is not to be applied for a component of a computer-aided design (CAD) model that represents a physical object; and
set an anti-constraint for the component of the CAD model, the anti-constraint specifying the given constraint is not to be applied for the component of the CAD model; and
an anti-constraint enforcement engine configured to:
identify a user modification to the CAD model that impacts the component; and
update the component in connection with the user modification without applying the given constraint specified in the anti-constraint.

10. The system of claim 9, wherein the anti-constraint enforcement engine is configured to update the component in connection with the user modification without applying the given constraint by:
identifying a candidate update to the component that includes the given constraint; and
determining not to apply the candidate update to the component in connection with the user modification to the CAD model.

11. The system of claim 9, wherein the anti-constraint enforcement engine is configured to update the component in connection with the user modification without applying the given constraint by:
identifying a set of candidate constraints to apply to the component based on the user modification to the CAD model, the set of candidate constraints including the given constraint;
filtering the given constraint from the set of candidate constraints to obtain a filtered set of candidate constraints; and
applying a candidate constraint from the filtered set of candidate constraints to the component in connection with the user modification to the CAD model.

12. The system of claim 9, wherein the anti-constraint configuration engine is configured to set multiple anti-constraints for the component, each anti-constraint of the multiple anti-constraints specifying a different constraint not to be applied for the component of the CAD model; and
wherein the anti-constraint enforcement engine is configured to update the component in connection with the user modification without applying any of the different constraints specified in the multiple anti-constraints.

13. The system of claim 9, wherein the anti-constraint configuration engine is further configured to set the anti-constraint as a permanent type anti-constraint, a temporary type anti-constraint, or any conditional type anti-constraint.

14. The system of claim 13, wherein the anti-constraint enforcement engine is further configured to:
identify a subsequent user modification to the CAD model that impacts the component; and
responsive to a determination that the anti-constraint is set as the permanent type anti-constraint:
update the component in connection with the subsequent user modification without applying the given constraint specified in the anti-constraint; and
responsive to a determination that the anti-constraint is set as the temporary type anti-constraint:
determine the given constraint as an inferred constraint for the component of the CAD model based on the subsequent user modification to the CAD model; and
propose the inferred constraint to a user for application on the component of the CAD model.

15. A non-transitory machine-readable medium comprising instructions, that when executed by a processor, cause a computer-aided design (CAD) system to:
maintain a CAD model that represents a physical object;

set an anti-constraint for a component of the CAD model, the anti-constraint specifying a given constraint not to be applied for the component of the CAD model;

identify a user modification to the CAD model that impacts the component; and update the component in connection with the user modification without applying the given constraint specified in the anti-constraint, including by:

identifying a candidate update to the component that includes the given constraint; and determining not to apply the candidate update to the component in connection with the user modification to the CAD model.

16. The non-transitory machine-readable medium of claim 15, wherein the instructions, when executed by the processor, cause the CAD system to update the component in connection with the user modification without applying the given constraint by:

identifying a set of candidate constraints to apply to the component based on the user modification to the CAD model, the set of candidate constraints including the given constraint;

filtering the given constraint from the set of candidate constraints to obtain a filtered set of candidate constraints; and applying a candidate constraint from the filtered set of candidate constraints to the component in connection with the user modification to the CAD model.

17. The non-transitory machine-readable medium of claim 15, wherein the instructions, when executed by the processor, cause the CAD system to set multiple anti-constraints for the component, each anti-constraint of the multiple anti-constraints specifying a different constraint not to be applied for the component of the CAD model; and wherein the instructions, when executed by the processor, cause the CAD system to update the component in connection with the user modification without applying any of the different constraints specified in the multiple anti-constraints.

18. The non-transitory machine-readable medium of claim 15, wherein the instructions, when executed by the processor, further cause the CAD system to set the anti-constraint as a permanent type anti-constraint, a temporary type anti-constraint, or any conditional type anti-constraint.

19. The non-transitory machine-readable medium of claim 18, wherein the instructions, when executed by the processor, further cause the CAD system to:

identify a subsequent user modification to the CAD model that impacts the component; and responsive to a determination that the anti-constraint is set as the permanent type anti-constraint:

update the component in connection with the subsequent user modification without applying the given constraint specified in the anti-constraint; and responsive to a determination that the anti-constraint is set as the temporary type anti-constraint:

determine the given constraint as an inferred constraint for the component of the CAD model based on the subsequent user modification to the CAD model; and propose the inferred constraint to a user for application on the component of the CAD model.

\* \* \* \* \*